(12) United States Patent
Jones, III et al.

(10) Patent No.: US 6,177,829 B1
(45) Date of Patent: Jan. 23, 2001

(54) DEVICE FOR IMPROVING THE SWITCHING EFFICIENCY OF AN INTEGRATED CIRCUIT CHARGE PUMP

(75) Inventors: Roy Clifton Jones, III, Dallas; Wayne T. Chen, Plano; David Cotton, Plano; Baoson Nguyen, Plano, all of TX (US)

(73) Assignee: Texas Instruments Incorporated, Dallas, TX (US)

(*) Notice: Under 35 U.S.C. 154(b), the term of this patent shall be extended for 0 days.

(21) Appl. No.: 09/196,335

(22) Filed: Nov. 19, 1998

Related U.S. Application Data

(60) Provisional application No. 60/066,114, filed on Nov. 19, 1997.

(51) Int. Cl.[7] .................................................... G05F 3/02
(52) U.S. Cl. ........................... 327/536; 327/537; 327/543; 363/60; 307/110
(58) Field of Search ................................ 327/536, 589, 327/535, 537, 543; 363/59, 60; 307/110

(56) References Cited

U.S. PATENT DOCUMENTS

| | | | |
|---|---|---|---|
| 4,029,973 | * 6/1977 | Kobayashi et al. | 326/88 |
| 5,589,793 | * 12/1996 | Kassapian | 327/536 |
| 5,889,428 | * 3/1999 | Young | 327/536 |
| 5,912,560 | * 6/1999 | Pasternak | 307/110 |
| 5,942,932 | * 8/1999 | Shen | 327/535 |

* cited by examiner

Primary Examiner—Timothy P. Callahan
Assistant Examiner—Terry L. Englund
(74) Attorney, Agent, or Firm—W. Daniel Swayze, Jr.; Wade James Brady III; Frederick J. Telecky, Jr.

(57) ABSTRACT

A charge pump uses switching transistors including a PMOS transistor (P1), a first transistor (N1), and a second transistor (N2) instead of diodes (D1, D2) to control the transfer of charge from a pump capacitor (14) to a storage capacitor (20). The voltage (60) at the storage capacitor (20) is applied to a level shifter (13) and to the source of the PMOS transistor (P1) which, in turn, biases the first transistor (N1) during low state of an oscillating waveform (30B). A supply rail (140) charges the pump capacitor (14) when the first transistor (N1) is in its active region during the low state of the oscillating waveform (30B) and turns OFF during the high state of the waveform (30B) causing the charge on the pump capacitor (14) to be transferred to the storage capacitor (20). The level shifter (13) is used to synchronize the oscillating waveform (30B) so that no charge is lost from the pump capacitor (14) back to the supply and minimal charge is conducted through a parasitic diode (55).

11 Claims, 2 Drawing Sheets

DEVICE FOR IMPROVING THE SWITCHING EFFICIENCY OF AN INTEGRATED CIRCUIT CHARGE PUMP

This application claims priority under 35 USC § 119(e)(1) of provisional application Ser. No. 60/066,114 filed Nov. 19, 1997.

TECHNICAL FIELD

The present invention relates in general to an multistage voltage generator system and in particular to a charge pump circuit that uses a configuration of switching transistors to transfer charge though succeeding stages while minimizing charge back to a preceding stage.

BACKGROUND OF THE INVENTION

The background is described in connection with a integrated circuit charge pump of the type commonly employed in a wide array of electronic system designs and applications. It should be understood, however, that the principles disclosed may apply to designs where system board space is limited and precise current switching is a requirement.

In integrated circuit design, it is often necessary to employ a multi-level driver that provides voltages higher than the supplied voltage rails to the system. For example, it is common to float the voltage into the gate of an NMOS transistor at a level above the supply rail in order to keep the efficiency of the circuit up and make the drop across the high side NMOS small. A common technique for doing this is to build a charge pump on the chip or printed circuit board.

Standard integrated circuit charge pumps are readily available from a variety of manufacturers. In general, charge pump designs vary according to the size of the load and the amount of space available with a particular application. A charge pump may be either all on-chip or partially off-chip with the primary factor being the size of the charging capacitors. Where the size of the charging capacitors are large, a partially off-chip solution is often employed to accommodate the larger charging capacitors which require more current to reach the high voltage side of the charge pump.

Prior art charge pumps use one or more "blocking" diodes that allow charge to be transferred from a first capacitor, i.e. the pumping capacitor, to a second storage capacitor. A voltage level sufficient to drive a blocking diode is necessary to permit charging of the storage capacitor. This configuration is illustrated in FIG. 1, wherein a standard charge pump doubler circuit 10 is shown using blocking diodes D1 and D2.

In operation the blocking or pump diodes D1 and D2 are used to allow charge to be transferred from the pumping capacitor 14 (Cp) to a storage capacitor 20 (Cs). A driver circuit 11 comprising a buffer with a high current capability receives an oscillating input 30 that sets the switching rate of the diodes D1, D2. The diodes D1 and D2 are used to block current in one direction, while maintaining current flow into either the pump capacitor 14 (Cp) or the storage capacitor 20 (Cs).

Due to the drops across the diodes D1 and D2, however, the drop across the storage capacitor 20 can only approximately double the supply voltage Vs. Thus, a limitation inherent to the doubler configuration 10 is the losses due to forward drops on the blocking diodes in the charging path.

Additionally, the blocking diodes D1 and D2 have internal parasitics which steal current or charge from the capacitors 14 and 20 thus lowering the charge pump's efficiency. A schottky diode with a small forward drop may be used to limit such parasitics, but integrated schottkys are usually very large and area inefficient in high current applications. Additionally, the large series resistance of schottky diodes reduces the charge pump efficiency making their practicality limited to integrated applications.

SUMMARY OF THE INVENTION

An improved charge pump device uses switching transistors rather than diodes to increase efficiency of the circuit and limit parasitic losses inherent to prior art charge pumps. The design synchronizes the switching transistors in such a way that changes to the charge pump circuitry are limited. Each transistor switch is configured to direct current in the right direction while maintaining the charge over the storage capacitor stable.

The charge pump circuit can be staged to implement either a single or multistage configuration. When the state or the output level for the previous stage is at the right level, the next stage is charged by coupling the output from one stage to the next stage via the negative terminal of the storage capacitor, which is connected to ground. The positive terminal of the capacitor is coupled to a transistor switch which turns ON only when the negative terminal of the capacitor is pulled to ground.

Disclosed in one embodiment, is an improved charge pump device using switching transistors instead of diodes that are turned ON and OFF in a way that minimizes charge back into a prior stage of the device. Charge is efficiently transferred from a pump capacitor to a storage capacitor by precisely switching an oscillating waveform into a level shifter. A driver circuit drives the gate of a first transistor switch which, in turn, biases a second transistor on during low state of the oscillating waveform. The transistors are more area efficient than prior art diodes and, as such, provide more efficient switching control of the charge transfer from the pump capacitor to the storage capacitor.

A supply rail is used to charge the pump capacitor when the first transistor is in its active region during the low state of the oscillating waveform applied by the drive circuit. The transistor turns OFF during the high state of the waveform causing the charge built-up on the pump capacitor to be transferred to the storage capacitor. The drive circuit is coupled to the negative terminal of the pump capacitor allowing a charge to build across the storage capacitor to a level approximately twice the supply voltage.

The level shifter is used to synchronize the oscillating waveform so that no charge is lost from the pump capacitor back to the supply or to a preceding stage in a multistage configuration.

Other aspects of the invention including its advantages and specific implementations are understood by those skilled in the art by reference to following detailed description taken in conjunction with the accompanying drawings.

BRIEF DESCRIPTION OF THE DRAWINGS

In the drawings.

Corresponding numerals in the figures refer to corresponding parts unless otherwise indicated.

DETAILED DESCRIPTION OF THE PREFERRED EMBODIMENTS

Figure 1:
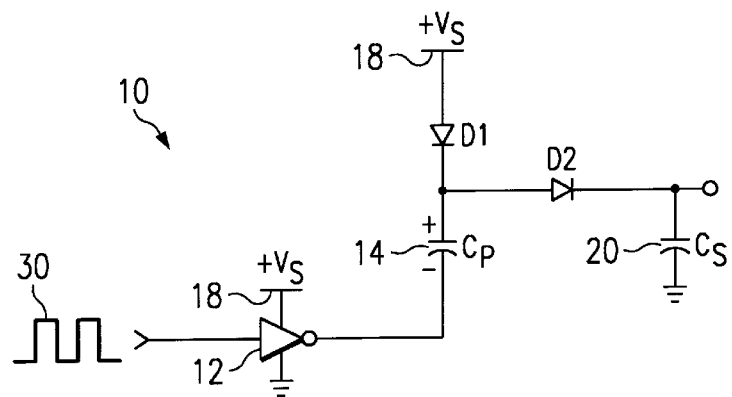
FIG. 1 is a circuit diagram of a prior art charge pump.
Figure 2:
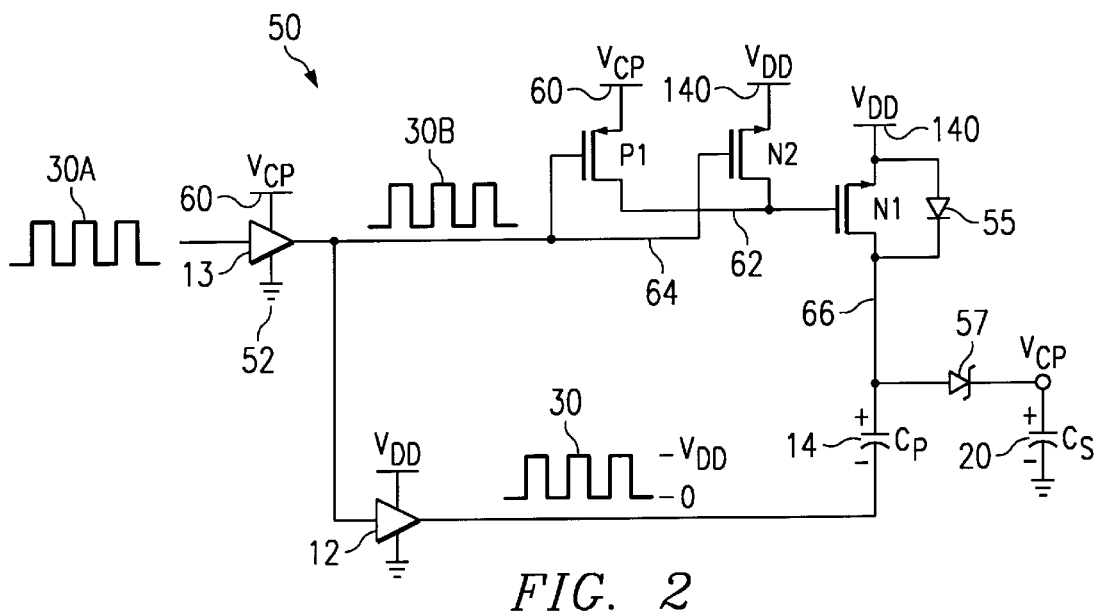
FIG. 2 is a circuit diagram of an charge pump according to one embodiment of the invention.

The prior art charge pump circuit of FIG. 1 is contrasted with that of FIG. 2 which illustrates an improved charge pump 50 according to one embodiment of the invention. In applications where diodes D1 and D2 are too large, transistors N1 and N2 can be used to save space and increase switching efficiency.

An oscillating signal source generates a output signal 30 that swings between the voltage supply rail 140 and ground 52. A configuration of transistors P1, N1 and N2 are coupled to the level shifter 13 and arranged to switch ON and OFF depending on the level state of said output waveform signal 30B.

The pump capacitor 14 is coupled to the switch signal path 62, 64 and 66 and ramps up to a charge approximately the supply rail 140. The storage capacitor 20 has its positive terminal Vcp in the charging path common to the pump capacitor 14 as well as the signal switch path. The configuration of transistors P1, N1 and N2 are configured so that charge from said pump capacitor 14 is transferred to the storage capacitor 20 during a partial cycle of the oscillating waveform 30B which is switched so that minimal charge from the pump capacitor 14 flows back into other stages of the device 50. The transistors P1, N1 and N2 control the charging of the pump capacitor 14 and the storage capacitor 20 via the switch signal path formed by traces 62, 64 and 66.

In operation, the oscillating waveform 30A provides an signal input 30A to the level shifter 13. The voltage 60 (Vcp) at the storage capacitor 20 is applied to the level shifter 13 and to the source of the PMOS transistor P1 which, in turn, drives the N1 transistor ON during the low state of the oscillating waveform 30B. The P1 transistor is coupled to an NMOS transistor N1 via path 62 with path 64 coupling the oscillating waveform 30B to the N2 transistor. Since transistors N1 and N2 are more area efficient than diodes, they provide more efficient switching control of the charge transfer from the pump capacitor 14 to the storage capacitor 20.

The supply rail 140 (Vdd) charges the pump capacitor 14 when the transistor N1 is in its active region during the low state of the oscillating waveform 30B applied by the drive circuit 12. Transistor N1 turns OFF during the high state of the waveform 30B causing the charge on the pump capacitor 14 to be transferred to the storage capacitor 20. The drive circuit 12 is coupled to the negative terminal of the pump capacitor 14 allowing a charge to build across storage capacitor 20 to a level approximately twice the supply voltage 140.

The level shifter 13 is used to synchronize the oscillating waveforms 30 and 30B so that no charge is lost from the pump capacitor 14 back to Vdd and minimal charge is conducted through the parasitic diode 55. The storage capacitor 20 can be tied directly to ground or to Vdd 140 according to various embodiments.

Figure 3:
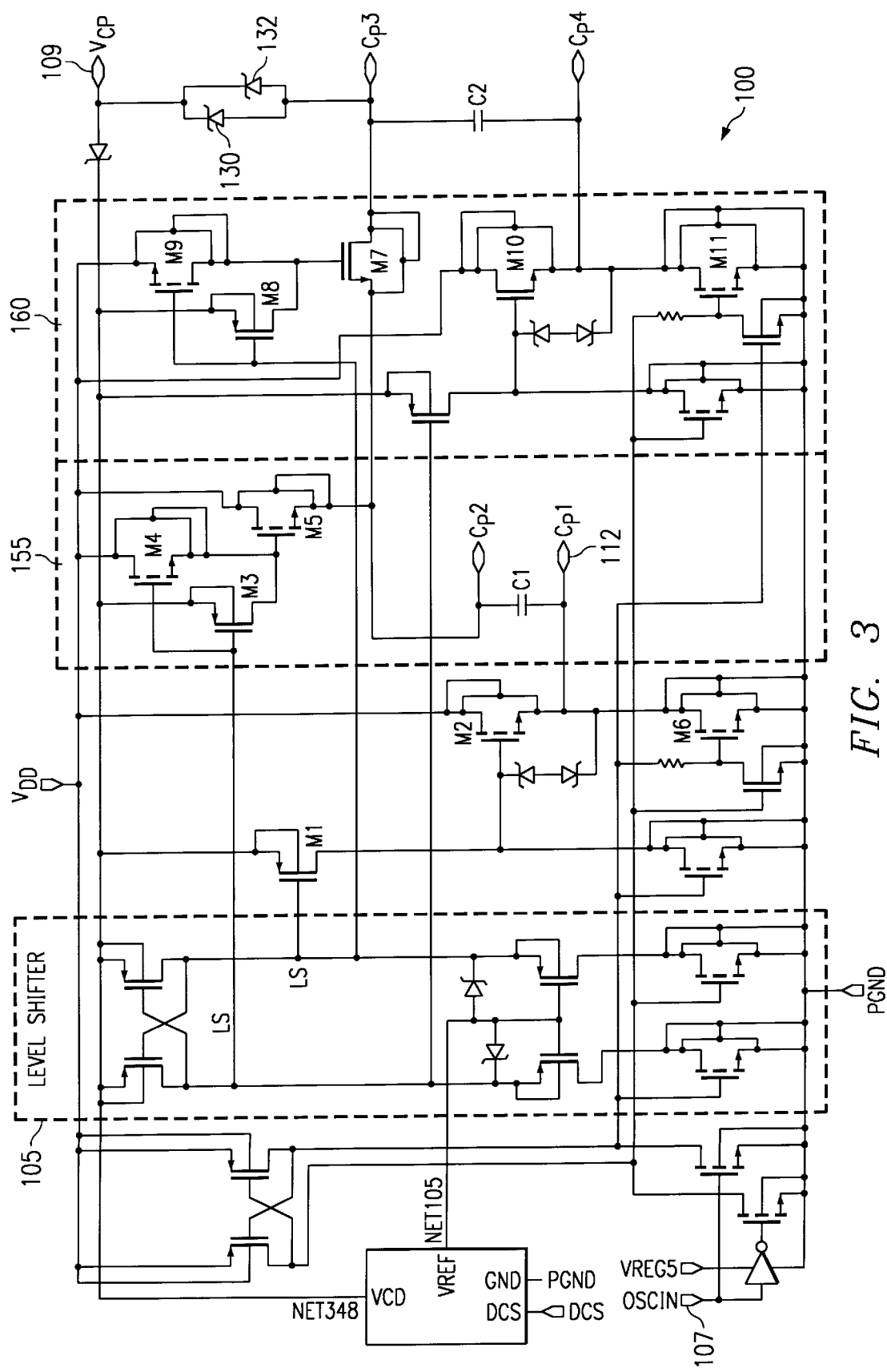
FIG. 3 is a schematic diagram of a voltage tripler circuit employing the charge pump configuration according to one embodiment of the invention.

The charge circuit 50 can be staged to form a multistage charge pump tripler 100 shown in FIG. 3. Preferably, transistors M5 and M7 are switched at times that avoid charge back into the previous stage. Improved switching performance is achieved by replacing the schottky diodes with transistors M3, M4, M5, M7, M8, and M9 that could be driven as synchronized switches. As shown, the switched transistors can be driven by the level shifter 105 that controls the transistors M1, M2, M3, M4 and M5 in one stage and M7, M8, and M9 in subsequent stage which, in turn, drive the pump capacitors C1 and C2.

In operation, the level shifter 105 provides voltage translation from the oscillator input 107 to the higher charge pump output level 109. The level shifter 105 produces high voltage swing complementary outputs. The PMOS transistor M1 pre-drives the gate of a LDMOS transistor M2. M2 and M6 are coupled to the negative terminal 112 of capacitor C1 which pumps charge either into a second capacitor C2 or a storage capacitor (not shown in FIG. 3).

Circuit 100 is arranged so that when LS is low, M2 is ON and M6 is OFF thus raising the negative end of the pump cap C1 to a potential near the supply rail 140 (Vdd). At the same time LS' is high so that the gate and source of PMOS transistor M3 is shunted resulting in M3 turning OFF. Transistors M4 and M5 are coupled to each other so that their sources reach the supply rail 140. Preferably M4 and M5 are also N-channel LDMOS type transistors.

Likewise, with LS' high, M4 is ON shorting the gate and source at M5. This results in M5 turning OFF, i.e. in "blocking" mode, and allows the charge from the first capacitor C1 to be delivered to a subsequent stage via a second set of "switches" M7, M8 and M9.

When LS is high and LS' is low, M3 is ON and M4 is OFF. This turns the "switch" transistor M5 ON. Also at this time, M2 is OFF and M6 is ON. M5 turns ON since it now has sufficient Vgs applied so that it can enter the linear region of conduction. As the capacitor C1 charge increases, the current through M5 and into M6 decreases so that the potential across the capacitor C1 reaches a final value closer to the supply rail 140 than achievable with equivalent circuit using diodes.

The charging of C1 near the supply rail 140 is due to the fact that when M5 and M6 are ON, they are driven into the linear region and the voltage drop across each transistor decreases to nearly zero as the charge current through the capacitor C1 decreases. This avoids the loss due to the diodes and parasitics and increases the efficiency of the change pump tripler 100. Additionally, the physical area consumed by the switches M1 through M9 is significantly less than comparable diodes providing a cost reduction while increasing performance. For example, in some applications a diode may consume as much as 25 times the area of the switching transistors.

Table 1 is a state table outlining the operation of circuit 100 according to one embodiment:

TABLE 1

State table of charge pump tripler circuit.

| | | (C1) | | | | (C2) | | | |
|---|---|---|---|---|---|---|---|---|---|
| LS | LS' | M1 | M2 | M6 | M5 | M3 | M10 | M11 | OPERATION |
| Vcp | GND | OFF | OFF (Charging) | ON | ON | OFF | ON (Discharging) | OFF | C1 charging to Vdd<br>C2 discharging through 130 and 132 into storage capacitor |
| GND | Vcp | ON | ON (Discharging) | OFF | OFF | ON | OFF (Charging) | ON | C1 discharging through M7 into C2 |

A first charge pump stage 155 is coupled to a second stage 160 so that the output at terminal 109 (Vcp) approaches three (3) times the supply voltage 140. When the state or the output level for one stage 155 is at the right level, the next stage 160 is charged by coupling the capacitor C1 to capacitor C2 via transistor switch M7. The positive terminal of the capacitor C2 is coupled to a transistor switch M7 permitting charge current to flow.

The phrase "circuitry" comprehends ASIC (Application Specific Integrated Circuits), PAL (Programmable Array Logic), PLA (Programmable Logic Array), decoders, memories, non-software based processors, or other circuitry, or digital computers including microprocessors and microcomputers of any architecture, or combinations thereof. Words of inclusion are to be interpreted as nonexhaustive in considering the scope of the invention.

Internal and external connections, communications links circuit or signal pathways can be ohmic, capacitive, direct or indirect, via intervening circuits or otherwise. Implementation is contemplated in discrete components or fully integrated circuits in silicon, gallium arsenide, or other electronic material families. It should be understood that various embodiments of the invention can employ or be embodied in hardware, software or micro coded firmware.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A charge pump comprising:

an oscillating signal source having an output signal that swings between a supply rail and ground reference level;

a configuration of transistors coupled to said oscillating signal source and arranged to respectively switch ON and OFF depending on the level state of said output signal, said configuration of transistors controlling a switch signal path;

a first capacitor coupled to said switch signal path and arranged to receive a charge approximately equal to said supply rail; and a second capacitor having a positive terminal in a charging path common to said first capacitor and said signal switch path;

wherein said configuration of transistors is configured so that said charge from said first capacitor is transferred to said second capacitor during a partial cycle of said signal source such that a minimal charge from said first capacitor flows back to said configuration of transistors; and wherein said configuration of transistors comprises three switching transistors staged to turn ON and OFF depending on said output signal.

2. The charge pump according to claim 1 wherein a first transistor of said three transistors is a PMOS type transistor.

3. The charge pump according to claim 2 wherein a second transistor of said three transistors is a NMOS type transistor having a source terminal coupled to a drain terminal of said first transistor to form a common signal path.

4. The charge pump according to claim 3 wherein a third transistor of said three transistors is a NMOS type transistor having a gate terminal coupled to said common signal path and a drain terminal coupled to a terminal of said first capacitor.

5. A charge pump comprising:

an oscillating signal source having an output signal that swings between a supply rail and ground reference level;

a configuration of transistors coupled to said oscillating signal source and arranged to respectively switch ON and OFF depending on the level state of said output signal, said configuration of transistors controlling a switch signal path;

a first capacitor coupled to said switch signal path and arranged to receive a charge approximately equal to said supply rail;

a second capacitor having a positive terminal in a charging path common to said first capacitor and said signal switch path, wherein said configuration of transistors is configured so that said charge from said first capacitor is transferred to said second capacitor during a partial cycle of said signal source such that a minimal charge from said first capacitor flows back to said configuration of transistors; and a level shifter with a bias having an input level equal to said positive terminal of said second capacitor and an output terminal that drives said oscillating signal source for switching said configuration of transistors.

6. A device for converting a supply voltage to a level approximately double the supply voltage comprising:

a storage capacitor with positive and negative terminals;

a level shifter including a bias terminal, coupled to said positive terminal of said storage capacitor, a signal input terminal and an output terminal;

a drive circuit including an input terminal coupled to said output terminal of said level shifter and an output terminal;

a first transistor including a gate terminal coupled to said output terminal of said level shifter, a source terminal coupled to said positive terminal of said storage capacitor and a drain terminal forming a switch signal path;

a second transistor including a source terminal coupled to said drain terminal of said first transistor, a gate terminal coupled to said output terminal of said level shifter and a drain terminal;

a third transistor including a gate coupled to said switch signal path and a source terminal coupled to said positive terminal of said storage capacitor; and a pump capacitor including a negative terminal coupled to said output terminal of said drive circuit and a positive terminal coupled to the source terminal of said third transistor, said pump capacitor arranged to receive charge through switching action of said first, second and third transistors on a first cycle of an oscillating waveform applied to said level shifter and transfer said charge to said storage capacitor on a second cycle of said oscillating waveform.

7. The device of claim 6 wherein the negative terminal of said storage capacitor is connected to ground.

8. The device of claim 6 wherein the negative terminal of said storage capacitor is connected to the supply voltage.

9. The device of claim 6 further comprising a diode between said source terminal of said third transistor and said positive terminal of said storage capacitor and arranged so that charge back through said diode is minimal.

10. The device of claim 6 wherein said storage capacitor receives charge from said pump capacitor when said third transistor turns OFF.

11. The device of claim 10 further comprising a diode between said source terminal of said third transistor and said positive terminal of said storage capacitor.

* * * * *